(12) United States Patent
Fuhse et al.

(10) Patent No.: US 9,734,735 B2
(45) Date of Patent: Aug. 15, 2017

(54) OPTICALLY VARIABLE SURFACE PATTERN

(71) Applicant: GIESECKE & DEVRIENT GMBH, Munich (DE)

(72) Inventors: Christian Fuhse, Otterfing (DE); Andreas Rauch, Ohlstadt (DE); Winfried Hoffmuller, Bad Tolz (DE)

(73) Assignee: Glesecke & Devrient GmbH, Munich (DE)

( * ) Notice: Subject to any disclaimer, the term of this patent is extended or adjusted under 35 U.S.C. 154(b) by 25 days.

(21) Appl. No.: 14/766,205

(22) PCT Filed: Jan. 30, 2014

(86) PCT No.: PCT/EP2014/000251
§ 371 (c)(1),
(2) Date: Aug. 6, 2015

(87) PCT Pub. No.: WO2014/121908
PCT Pub. Date: Aug. 14, 2014

(65) Prior Publication Data
US 2016/0023495 A1    Jan. 28, 2016

(30) Foreign Application Priority Data

Feb. 7, 2013  (DE) ................. 10 2013 002 137

(51) Int. Cl.
*B42D 25/00* (2014.01)
*G09F 9/30* (2006.01)
(Continued)

(52) U.S. Cl.
CPC ............... *G09F 9/30* (2013.01); *B42D 25/29* (2014.10); *B42D 25/328* (2014.10);
(Continued)

(58) Field of Classification Search
CPC .... B42D 25/29; B42D 25/324; B42D 25/328; B42D 25/342; B42D 25/355;
(Continued)

(56) References Cited

U.S. PATENT DOCUMENTS

| 6,283,509 B1* | 9/2001 | Braun ................. B42D 25/328 283/72 |
|---|---|---|
| 8,964,296 B2 | 2/2015 | Hoffmuller et al. |
| 2005/0106367 A1 | 5/2005 | Raksha et al. |
| 2007/0241553 A1* | 10/2007 | Heim ................... B42D 25/351 283/91 |
| 2008/0009412 A1* | 1/2008 | Funada .................... B41M 3/12 503/200 |
| 2008/0137160 A1* | 6/2008 | Wiltshire ................ G03H 1/26 359/2 |
| 2010/0027082 A1* | 2/2010 | Wiltshire ............. G03H 1/0248 359/2 |
| 2010/0230615 A1* | 9/2010 | MacPherson ........ B42D 25/364 250/488.1 |
| 2011/0079997 A1* | 4/2011 | Heim ..................... B42D 25/29 283/85 |
| 2011/0114733 A1* | 5/2011 | Heim ..................... B42D 25/29 235/491 |

(Continued)

FOREIGN PATENT DOCUMENTS

| DE | 102010047250 A1 | 6/2011 |
| DE | 102010019766 A1 | 11/2011 |
| WO | 2012069163 A1 | 5/2012 |

OTHER PUBLICATIONS

International Search Report for corresponding International PCT Application No. PCT/EP2014/000251, Apr. 8, 2014.

*Primary Examiner* — William R Alexander
(74) *Attorney, Agent, or Firm* — Workman Nydegger

(57) ABSTRACT

An optically variable surface pattern is made available, having at least two partial areas with reflection elements, wherein the reflection elements of the first partial region on the one hand and the reflection elements of the second partial region on the other hand reflect impinging light in different reflection directions. The first partial region is so covered with a first glazing ink layer that a viewer, upon a change of the viewing angle at which the viewer views the optically variable surface pattern, sees the first partial region glow in a first color upon reaching a first viewing angle. The second partial region glows in a second color that is different from the first color upon reaching a second viewing angle.

17 Claims, 5 Drawing Sheets

(51) Int. Cl.
| | |
|---|---|
| *G02B 5/09* | (2006.01) |
| *B42D 25/29* | (2014.01) |
| *B42D 25/342* | (2014.01) |
| *B42D 25/355* | (2014.01) |
| *B42D 25/328* | (2014.01) |
| *G02B 5/18* | (2006.01) |
| *B42D 25/324* | (2014.01) |

(52) U.S. Cl.
CPC ......... *B42D 25/342* (2014.10); *B42D 25/355* (2014.10); *G02B 5/09* (2013.01); *G02B 5/1861* (2013.01); *B42D 25/324* (2014.10); *B42D 2033/06* (2013.01); *B42D 2033/10* (2013.01); *B42D 2033/16* (2013.01); *B42D 2033/18* (2013.01); *B42D 2033/20* (2013.01); *B42D 2033/24* (2013.01); *B42D 2035/14* (2013.01); *B42D 2035/16* (2013.01); *B42D 2035/24* (2013.01); *B42D 2035/36* (2013.01); *B42D 2035/50* (2013.01)

(58) Field of Classification Search
CPC .. B42D 2033/00; B42D 2033/06; G02B 5/09; G02B 5/1861; G09F 9/30
USPC .......................... 359/566, 558, 567, 568, 569
See application file for complete search history.

(56) References Cited

U.S. PATENT DOCUMENTS

| | | | |
|---|---|---|---|
| 2012/0146323 A1* | 6/2012 | Schilling | G02B 5/1861 283/85 |
| 2012/0156446 A1* | 6/2012 | Brehm | B42D 25/29 428/195.1 |
| 2012/0161431 A1* | 6/2012 | Vulpius | B29C 55/023 283/85 |
| 2012/0170124 A1* | 7/2012 | Fuhse | B42D 25/29 359/585 |
| 2012/0319395 A1* | 12/2012 | Fuhse | G02B 5/1842 283/67 |
| 2013/0063826 A1 | 3/2013 | Hoffmuller et al. | |
| 2013/0250419 A1 | 9/2013 | Lochbihler | |

* cited by examiner

OPTICALLY VARIABLE SURFACE PATTERN

BACKGROUND

The present invention relates to an optically variable surface pattern having at least two partial regions with reflection elements, wherein the reflection elements of the first partial region on the one hand and the reflection elements of the second partial region on the other hand reflect impinging light in different reflection directions.

DE 10 2010 047 250 A1 shows such an optically variable surface pattern, wherein the reflection elements are configured as embossed micro-mirror structures, to which a color-shifting layer can be applied. The color-shifting layer can be configured in particular as a thin-film interference coating.

Further, optically variable security features are known, which, upon tilting, present a kinetic effect in combination with a color change to a viewer. In the banknote area, for example the effect ink SPARK of the Swiss company SICPA HOLDING SA is widespread. This ink is based on platelet-shaped pigments which are coated with a thin-film interference system and are magnetically oriented after printing. Here, the "rolling bar" effect is particularly well known, where the pigments are so oriented that for example upon tilting a bright bar runs up and down within a value number, also changing its color while doing so. The color-change effect is based on the thin-film interference system of the pigments here.

The described interference coatings are usually a layer system of absorber/dielectric/reflector (e.g. =Cr/SiO$_2$/Al), which is vapor-deposited under a vacuum for example by means of electron-beam vaporization. These vaporization processes are comparatively expensive, since the different layers frequently must also be applied in respectively separate operations. The effort becomes particularly great when for example even a coating on both sides is required for the manufacture of corresponding effect pigments.

It is further known to produce color changes through cholesteric liquid crystals. However, these are comparatively faintly luminous and are sufficiently visible mostly only against a dark background.

SUMMARY

Proceeding therefrom, it is therefore the object of the invention to so further develop an optically variable surface pattern of the type mentioned at the outset that it provides changing colors in dependence on the viewing angle and can be manufactured in cost-effective fashion.

According to the invention, the object is achieved in an optically variable surface pattern of the type mentioned at the outset by covering the first partial region with a first glazing ink layer, so that, when the viewing angle at which the viewer looks at the optically variable surface pattern is changed, a viewer sees the first partial region glow in a first color upon reaching a first viewing angle, and sees the second partial region glow in a second color differing from the first color upon reaching a second viewing angle.

By the reflection elements, light that impinges on the optically variable surface pattern for illumination is reflected in the corresponding reflection directions, so that, upon viewing the surface pattern at the corresponding viewing angle (that can be allocated to the reflection direction), a much greater brightness is present than in comparison to viewing at other viewing angles. When the viewing angle is changed, for the viewer practically a lighting up takes place at the corresponding viewing angle, so that he then sees the color of the corresponding partial region virtually light up. A viewer hardly or only minimally perceives the color of the partial region that does not light up.

Consequently, the desired color-change effect is made available to the viewer, wherein the optically variable surface pattern according to the invention can be produced cost-effectively. No elaborate interference coatings are required. It is sufficient when the first partial region is covered with the first glazing ink layer.

In particular, the second partial region can be covered by a second glazing ink layer that differs in color tone from the first glazing ink layer.

It is thereby possible to freely adjust the colors in which the partial regions light up.

The reflection elements are so configured in particular that they reflect achromatically. Consequently, the color in which the corresponding partial region lights up can be adjusted only by means of the glazing ink layer.

Further, at least one further partial region with reflection elements can be provided, said further region being covered by a further glazing ink layer, wherein the reflection elements of the further partial region are so oriented that, upon changing the viewing angle, the viewer sees the further partial region glow in a color that differs from the first and/or second color upon reaching a further viewing angle. This leads to an impressive optical effect.

In particular, a multiplicity of further partial regions having further glazing ink layers can be provided, so that any desired color-change sequences upon changes of the viewing angle can be realized. Further, it is possible that quasi-continual color changes are achieved.

The glazing ink layers can be so configured that they cover respectively only the partial region to which they are allocated. However, it is also possible that they extend at least partially over at least one further partial region.

The optically variable surface pattern can be so configured that a sequence of the colors of the partial regions glowing consecutively upon changing the viewing angle contains a color change to and/or from the color white, has at least one color several times, is different from a sequence which would occur by interference in a thin-film coating, and/or is different from a sequence which would occur by wavelength-dependent diffraction or refraction.

Further, the optically variable surface pattern can have a reference region that glows always in the same color at the corresponding viewing angles of the partial regions. The reference region can have a glazing ink layer. However, it is also possible to use a different ink and in particular a different printing ink.

Further, the optically variable surface pattern can be so configured that, for the viewer, upon changing the viewing angle, the partial regions glow consecutively in such a fashion that a movement of a motif is reproduced, wherein at least a part of the motif glows consecutively in the corresponding colors of the partial regions. During the movement, the motif can keep its shape and size. However, it is also possible that its shape and/or size changes. Consequently, e.g. also pumping effects and morphing effects can be realized.

The optically variable surface pattern can be so configured that a part of the motif always glows in the same color upon viewing at the corresponding viewing angles of the partial regions. Of course, it is also possible that the entire motif glows consecutively in the corresponding colors of the partial regions.

The optically variable surface pattern can further be so configured that the first and second partial region are so mutually interlaced that a apparently uniform region is presented to the viewer, with said apparently uniform region glowing in the first color upon viewing at the first viewing angle, and in the second color upon viewing at the second viewing angle. It is further possible that the apparently uniform region has more than two partial regions with different colors, wherein the partial regions are so mutually interlaced that an apparently uniform region is presented to the viewer, with said apparently uniform region then glowing in respectively different colors upon viewing at the different viewing angles of the corresponding partial regions.

In the optically variable surface pattern reflection elements of at least one of the partial regions can be formed by relief structures with (substantially) ray-optically active reflective facets. This can be realized for example by embossing a corresponding layer, in particular a thermoplastic or radiation-curing lacquer layer. The reflective facets can be formed by coating with a reflection-enhancing coating, in particular a metallic coating (such as e.g. Al, Cr, Ag, Cu, Au), an alloy and/or a highly refractive coating.

Further, the reflective facets which can also be referred to as micro mirrors, can be configured as regular sawtooth gratings or as an irregular arrangement. The facet size is preferably between 3 µm and 300 µm, particularly between 3 µm and 50 µm and particularly preferably between 5 µm and 20 µm.

As reflection elements also trough-shaped or rib-shaped structures, in particular concave or convex cylindrical surface sections, can be utilized, which fan out incident light around their longitudinal direction. Thereby different partial regions can light up brightly from different angles for example upon rotation of the surface pattern in its plane. Consequently, for example also the running effects described in WO 2012/069163 A1 for retroreflectors could be produced with suitable glazing inks instead of an interference coating. Typical structure dimensions here can also be e.g. between 2 µm and 300 µm, preferably between 3 µm and 50 µm and particularly preferably between 5 µm and 20 µm.

Further, in the optically variable surface pattern reflection elements of at least one of the partial regions can be formed by optically-diffractively active reflective relief structures. The relief structures can be symmetrical or asymmetrical, in particular they can be configured as achromatic matte structures.

In the optically variable surface pattern reflection elements of at least one of the partial regions can be realized by oriented pigments of a printing ink. Here, it is possible that the pigments are metalized platelet-shaped pigments, which can be magnetically oriented for example. The pigments can also be oriented by arrangement on a corresponding embossed structure. The pigments can be printed over with glazing ink. It is possible that the reflective pigments are arranged directly in an otherwise glazing ink. Also an orientation of the pigments using steel engraving is possible.

The reflection elements of the partial regions can be partially reflective in particular. In this case, the optically variable surface pattern can also be utilized in transmission.

In particular, in further embodiments also different colors can be realized in transmission and/or in plan view from two sides. For example, reflection elements provided with a semitransparent metalization or a highly refractive coating can be coated in yellow from one side (front side) and in magenta from the other side (back side). The reflection element then lights up in yellow from the front side and in magenta from the back side, and shows the mixed color red in transmission. Outside the reflection direction of the reflection elements a red color impression can be present here as well. Of course, also opaque reflection elements can be covered with different colors on their front and back side.

In the optically variable surface pattern reflection elements of at least one of the partial regions can be formed by relief structures in a metalized foil.

The colors that the partial regions have to the viewer upon viewing the optically variable surface pattern can be independent of the viewing angle. It is therefore possible to provide a glazing ink layer, which contributes to the cost-effective producibility of the optically variable surface pattern according to the invention.

In particular, the first glazing ink layer can have a register accuracy of less than 200 µm, preferably less than 50 µm and particularly preferably less than 10 µm, to the reflection elements of the first partial region. This register accuracy is also valid for the other glazing ink layers relative to the corresponding reflection elements of the corresponding partial regions.

For the manufacture of the optically variable surface pattern according to the invention with printing in register or printing appearing to be in register, there can be used for example a dyed etching resist, possibly also with protection of a further ink by resist, there can be created at least one contour of reflection elements and inks at the same time by means of lasering (advantageously using a mask), metal can be structured and used as laser mask for glazing ink(s), a laser-resistant ink can be utilized as mask for demetalization, metal transfer procedures can be made use of, a patch having the desired contours of the motif can be cut out of larger metalized regions and/or regions covered in glazing fashion, and/or a directed sublimation of a glazing ink or glazing inks can be effected.

The manufacturing method according to the invention can be further developed in particular such that the optically variable surface pattern according to the invention (including its further developments) can be manufactured.

The optically variable surface pattern according to the invention (including its further developments) can be used as a security element, in particular as a security element for a security paper, value document or the like. In particular, a value document is made available having an optically variable surface pattern according to the invention (including its further developments).

The optically variable surface pattern can in particular be configured as a security thread, tear thread, security band, security strip, patch or as a label for application to a security paper, value document or the like. In particular, the optically variable surface pattern can span transparent regions or gaps.

Thus, the optically variable surface pattern according to the invention can be made use of in a window or in a transparent region on a polymer banknote. From one side, the optically variable surface pattern with the color change according to the invention will then appear upon tilting. From the other side (back side), the viewer will then see the color of the metalization (for example aluminum), if one of the reflection elements has a metalized coating. Of course, the optically variable surface pattern according to the invention can also be so configured that the at least two partial regions are formed on a first side (front side) of the optically variable surface pattern. On the back side, then in the same fashion again at least two partial regions with reflection elements can be formed, like on the front side. Thus, upon viewing the back side of the optically variable surface pattern, one will again see the described color-change effect.

Of course, it is possible that the color-change effects of the front side and the back side are the same or different.

The utilization of the optically variable surface pattern according to the invention in polymer banknotes is advantageous for the following reasons in particular. Polymer (e.g. PP) is particularly heat-sensitive. Providing foil strips/patches is therefore more difficult than e.g. on paper. Further, there exists already the process in which at the gravure printing machine embossing lacquer is printed, embossed and the produced holograms are printed over/metalized with a special type of supersilver ink. Providing further printed layers, such as e.g. a glazing ink layer is therefore easily possible. The glazing ink layers here can be printed both on the same side of the banknote (printing of embossing lacquer), then embossing, then supersilver, then glazing inks again, and on the back side (e.g. after turning over the substrate). This can be effected in particular in one printing process, which is advantageous in view of the register situation.

Since, in comparison to holograms, the surfaces of the reflection elements are large, more materials can be used for producing the reflective facets.

The term security paper is understood here to be in particular the precursor to a value document not yet fit for circulation, which can have besides the optically variable surface pattern according to the invention for example also further authenticity features (such as e.g. luminescent substances provided within the volume). Value documents are understood here to be, on the one hand, documents manufactured from security papers. On the other hand, value documents can also be other documents and objects that can be provided with the optically variable surface pattern according to the invention in order for the value documents to have uncopiable authenticity features, thereby making it possible to check authenticity and at the same time preventing unwanted copying.

It is evident that the features mentioned above and those to be explained hereinafter are usable not only in the stated combinations, but also in other combinations or in isolation, without going beyond the scope of the present invention.

BRIEF DESCRIPTION OF THE DRAWINGS

Hereinafter the invention will be explained more closely by way of example with reference to the attached figures, which also disclose features essential to the invention. For clarity's sake the figures do without a true-to-scale and true-to-proportion representation and without hatchings. The figures are described as follows.

DETAILED DESCRIPTION OF VARIOUS EMBODIMENTS

Figure 1:
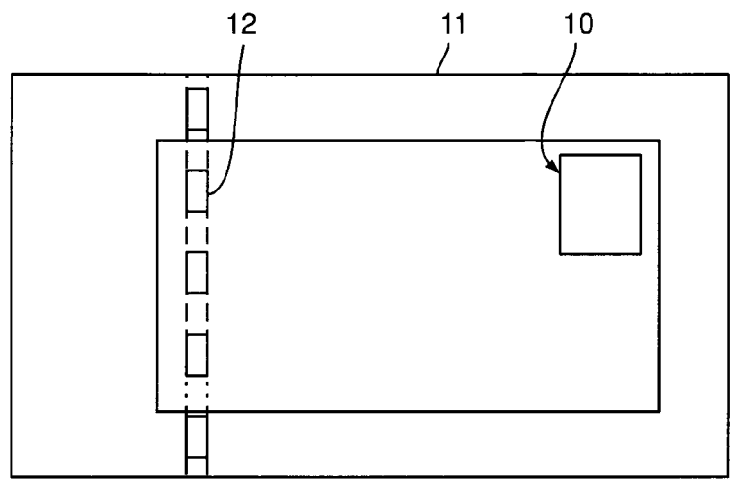
FIG. 1 a plan view of a bank note having an optically variable surface pattern 10 according to the invention.

In the embodiment shown in FIG. 1, the optically variable surface pattern according to the invention is so integrated as a security element in a bank note 11 that it is visible in the front side of the bank note shown in FIG. 1. Alternatively, the optically variable surface pattern 10 according to the invention can be present e.g. as a windowed thread 12.

Figure 2:
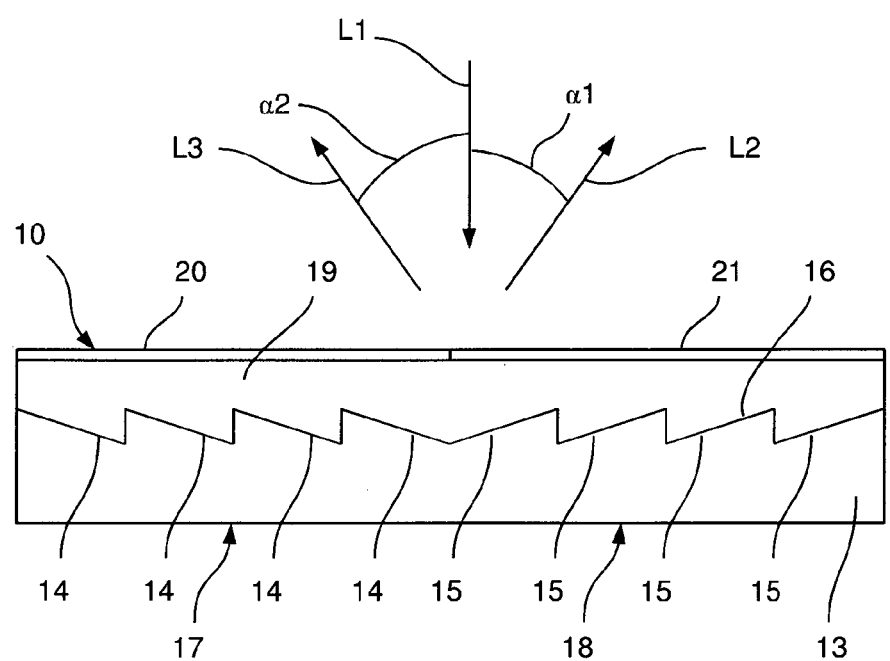
FIG. 2 an enlarged sectional representation of the optically variable surface pattern 10 of FIG. 1.

As can be gathered from the enlarged sectional representation of the optically variable surface pattern 10 in FIG. 2, the surface pattern 10 has an embossing lacquer layer 13 (e.g. thermoplastic or radiation-curing), on the top side of which first facets 14 and second facets 15 are formed, wherein the first facets 14 have a first orientation and the second facets 15 have a second orientation that differs from the first orientation. To the facets 14, 15 a reflective coating 16 (in particular a metalization) is applied, so that the facets 14 and 15 are configured as reflective facets. The first facets 14 form a first partial region 17 and the second facets 15 form a second partial region 18 of the surface pattern 10.

To the facets 14, 15 a transparent intermediate layer 19 is applied, the top side of which facing away from the facets 14, 15 is configured to be flat. To the top side of the intermediate layer 19 there is applied in the first partial region a first glazing ink layer 20 (for example of the color red) and in the second partial region 18 a second glazing ink layer 21 (for example of the color green). It is also possible to say that the top side of the transparent intermediate layer 19 in the first partial region 17 is covered by a first glazing ink and in the second partial region 18 is covered by a second glazing ink.

Due to the different orientations of the first and second facets 14 and 15, a light source (incident light L1) appears at different viewing angles α1, α2, in dependence on the corresponding partial region 17, 18. Thus the incident light L1 is reflected by the first facets 14 in the direction L2, whereas the incident light L1 is reflected by the second facets 15 in the direction L3.

Consequently, the first partial region 17 of the optically variable surface pattern 10 lights up brightly in red color for a viewer, when the viewer looks at the optically variable surface pattern 10 at the first viewing angle α1, at a direction of incidence of the illuminating light according to the arrow L1. The reason for this is that in this case the viewing direction coincides with the mirror reflex of the first facets 14. When the viewer looks at the optically variable surface pattern 10 at the second viewing angle α2, the second partial region 18 lights up brightly for him in green color, since in this case the viewing direction coincides with the mirror reflex of the second facets 15 when these are illuminated by the incident light L1.

Surprisingly, it has been found that the color of the respectively dark facets 14, 15 is practically not noticed, and a viewer substantially only perceives the color of the currently brightly lighting up facets 15, 14.

The viewing of the optically variable surface pattern at the two different viewing angles $\alpha 1$, $\alpha 2$ can be effected by the viewer changing his position and/or by tilting the optically variable surface pattern 10 correspondingly.

The thickness of the two ink layers 20, 21 is preferably the same and for example can be in the range of 0.1 µm to 6 µm, preferably 0.6 µm up to 2 µm.

In a further variant, the embossing lacquer layer 13 itself can be used as glazing layer, wherein the former is dyed differently in the partial regions 17 and 18. The surface pattern would then be viewed from the other side, thus through the embossing lacquer.

Figure 3:
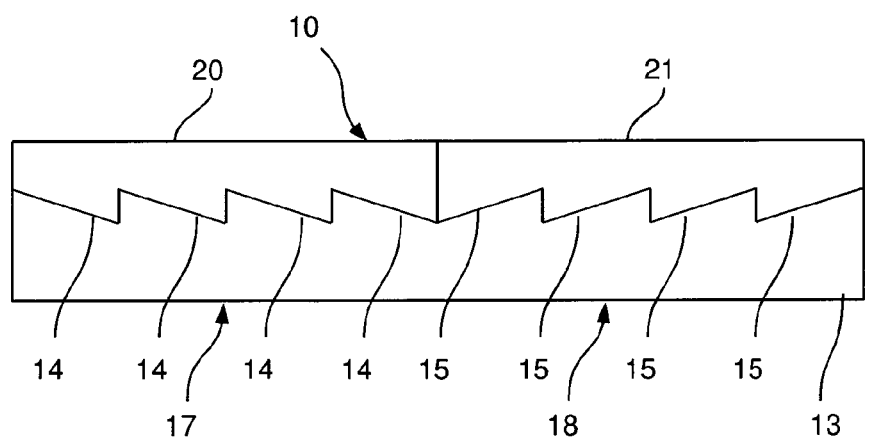
FIG. 3 an enlarged sectional representation of a variation of the optically variable surface pattern 10 according to FIG. 2.

In a variant of the optically variable surface pattern 10 shown in FIG. 3 the transparent intermediate layer 19 is not provided. Instead, the facets 14, 15 of the two partial regions 17, 18 are embedded completely in the two ink layers 20, 21.

Figure 4:
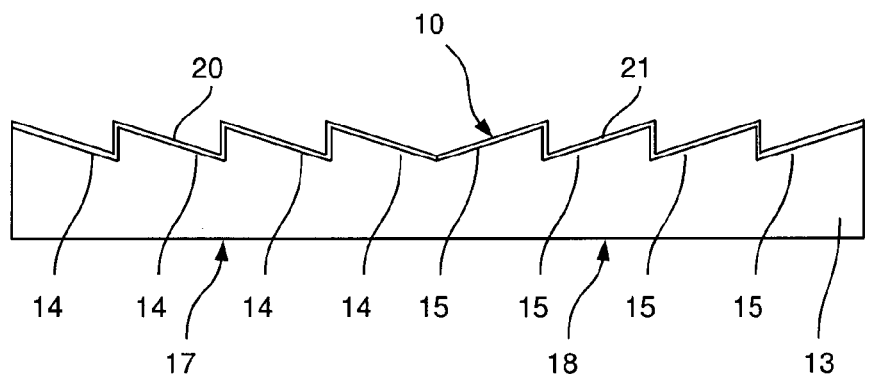
FIG. 4 an enlarged sectional representation of a variation of the optically variable surface pattern 10 of FIG. 2.

In FIG. 4 a variant of the optically variable surface pattern 10 is shown wherein the two ink layers 20, 21 are formed directly on the facets 14, 15 with a thickness according to the embodiment of FIG. 2.

Figure 5:
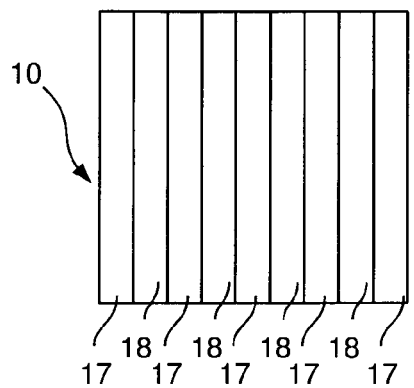
FIG. 5 a plan view of an example of the mutual interlacing of the two partial regions 17 and 18 of the optically variable surface pattern according to the invention.
Figure 6:
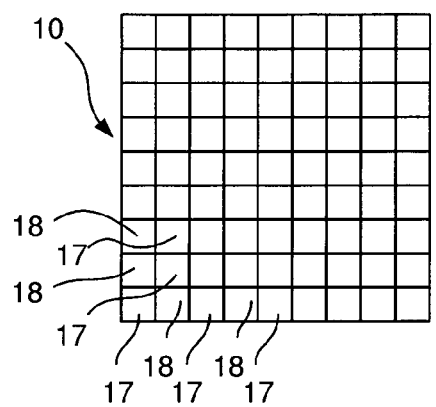
FIG. 6 a plan view of an example of the mutual interlacing of the two partial regions 17 and 18 of the optically variable surface pattern according to the invention.

Further, the optically variable surface pattern according to FIGS. 2, 3 and/or 4 can be so configured that it has several first and second partial regions 17, 18 which are finely mutually interlaced. Thus the partial regions 17, 18 can for example be configured as narrow strips of a width of e.g. 100 µm, which are arranged alternatingly (FIG. 5). The strips can have one or several first and/or second facets 14, 15. Of course, also any other type of mutual interlacing is possible. Thus e.g. a checkerboard-type interlacing can be present (FIG. 6).

A viewer can no longer resolve the structure of this interlacing with the unarmed eye, so that he sees the complete optically variable surface pattern 10 light up in light red at the first viewing angle $\alpha 1$ and light up in light green at the second viewing angle $\alpha 2$.

This effect can be compared to the image of a color monitor, which is most frequently a combination of red, green and blue subpixels. In the color monitor, a color change from red to green is realized by switching off the red and switching on the green pixels. In the optically variable surface pattern according to the invention the red reflection elements (first facets 14 having the first glazing ink layer 20) are guided out of their reflection direction and consequently turn dark, while the green reflection elements (second facets 15 having the second glazing ink layer 21) are turned into the corresponding reflection direction and consequently turn bright to the viewer.

Figure 7:
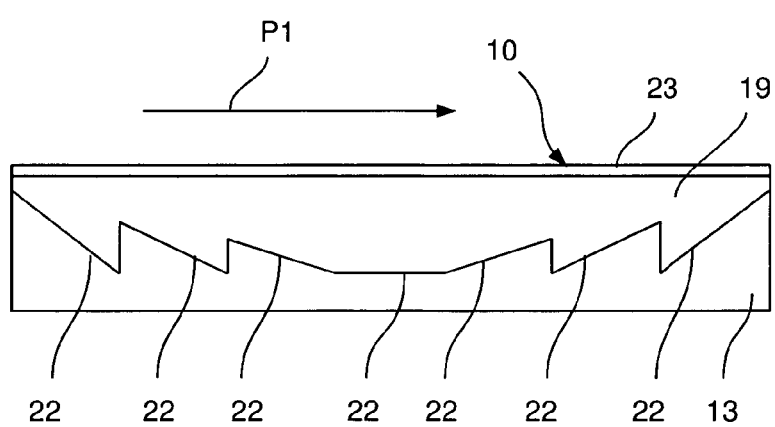
FIG. 7 an enlarged sectional representation of a further embodiment of the optically variable surface pattern 10 of FIG. 1.

FIG. 7 schematically shows an embodiment of the optically variable surface pattern 10 according to the invention, wherein the orientation of the facets 22, which are configured as reflective facets 22 in the same fashion as in the embodiments described so far, changes in stepwise fashion, as represented in FIG. 7. To the transparent intermediate layer 19 a glazing ink layer 23 is applied, which has a color gradation along the direction of the arrow P1.

When a viewer sees the first facet 22 on the very left in FIG. 7 light up brightly and then tilts the optically variable surface pattern 10, the perceivable light reflex moves for the viewer, since for the viewer the light reflexes of the facets 22 light up consecutively from left to right in accordance with FIG. 7. For the viewer consequently a moving light reflex is visible, which changes its color at the same time, since a different color for the light reflex is allocated to each facet 22 due to the glazing ink layer 23. Thus for example a color gradation can be realized from red via orange, yellow, up to green. However, any other color gradation is possible as well. In particular, colors can also be present several times.

In the embodiment shown in FIG. 7, the optically variable surface pattern 10 consequently has seven partial regions (although every partial region here has one schematically shown facet 22, also several facets 22 can be provided per partial region), which are respectively covered with a different color of the ink layer 23 and consequently a part of the ink layer 23. Therefore, every part of the ink layer 23 that is allocated to one of the partial regions can be referred to as glazing ink layer itself. Consequently, in the described embodiment seven glazing ink layers are provided, forming the ink layer 23 together.

Of course, many more facets and different angles can be realized than shown in the schematic representation in FIG. 7. The more facets with different orientations are provided, the more continuously does the kinetic effect appear that is reproduced by the different orientations of the facets.

In particular, the orientations of the facets 22 can have a (quasi) random component, as described in DE 10 2010 047 250 A1. What is essential is that the average values of the orientations of the facets 22 change in the desired fashion (preferably continuously or quasi-continuously).

Thus for example the "rolling bar" effect described in DE 10 2010 047 250 A1 can be combined with a color change by providing glazing ink layers, which color change is surprisingly similar to the color change by coating the facets with a thin-film interference layer system of absorber/dielectric/reflector. However, in the optically variable surface pattern 10 according to the invention, it is possible to make available a color change which is impossible with an interference coating. Thus a color change by interference coatings is limited by e.g. the spectrum's shifting as a rule to the short-wave range upon tilting out of the perpendicular plan view. Consequently, for example a color change is possible from green to blue, but not the other way around, from blue to green. Such a color change from blue to green can be realized without problems using the optically variable surface pattern according to the invention. Further, the color gradation in the optically variable surface pattern 10 according to the invention can run out of or into white (white is also understood as a color here). Moreover, the color can change not only from a first color to a second color, but can e.g. also pass through several colors, for example from yellow via green to red or from blue to green and back to blue. A color gradation with the glazing ink layers can consequently pass from any desired first color to any desired second color and possibly to at least one third color, wherein the third color can differ from the first and second color or can be e.g. the same as the first color.

Figure 8:
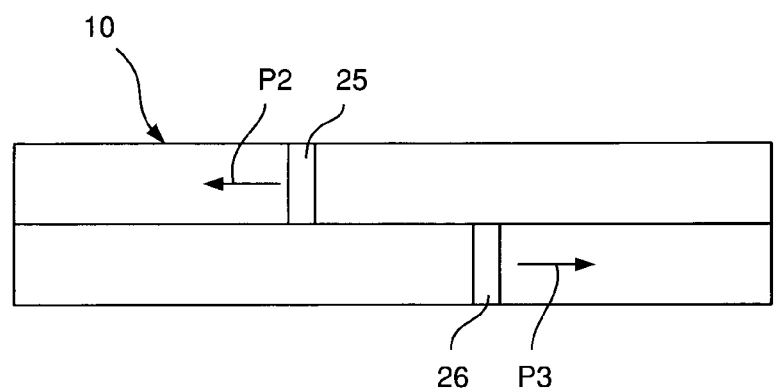
FIG. 8 a plan view of a further embodiment of the optically variable surface pattern 10 according to the invention.

In the embodiment of the optically variable surface pattern shown in FIG. 8 an oppositely directed running effect is made available, wherein a first bar 25 apparently runs to the left (arrow P2) and a second bar 26 apparently runs to the right (arrow P3) at the same time, when the viewer changes his viewing angle.

Figure 9:
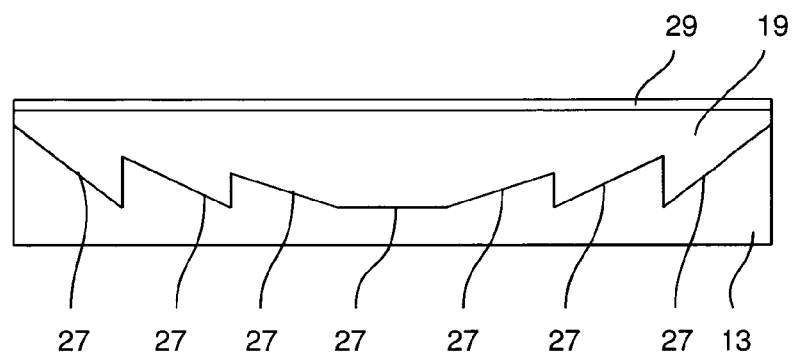
FIG. 9 a sectional view of a part of the optically variable surface pattern of FIG. 8.
Figure 10:
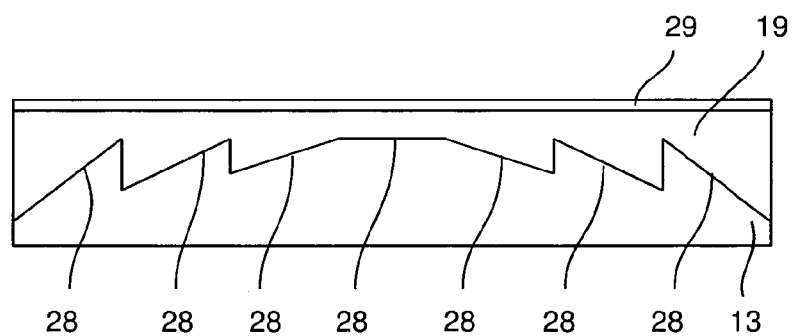
FIG. 10 a sectional view of a part of the optically variable surface pattern 10 of FIG. 8.

The arrangement of the facets 27 for the apparent movement of the first bar 25 is represented in FIG. 9. The arrangement of the facets 27 for the apparent movement of the second bar 26 is represented in FIG. 10. The facets 27, 28 can be configured in the same fashion as the already described facets 14, 15, 22. To the facets 27, 28 for both bars 25 and 26 there is again applied a glazing ink layer, having a color gradation from the color cyan from the left in FIG. 8 up to the right to the color yellow. The color gradation can be chosen such that the color green is present in the middle. A viewer consequently sees two bars 25 and 26, which from a certain viewing direction are first both in the middle and appear to be green. Upon tilting, the upper bar 25 runs to the left and turns cyan, while the lower bar 26 runs to the right and turns yellow. Thereby a very dynamic appearance is achieved with the movement of the bars 25 and 26 and clear color changes.

The surface pattern 10 according to the invention thus appears very colorful and dynamic.

However, it is also possible to cover the facets 27, 28 for either of the two bars 25 and 26 over the full surface with two differently glazing inks, so that the first bar 25 always has a first color and the second bar 26 always has a second color.

Besides the described kinetic effects, the person skilled in the art of course knows a multiplicity of further dynamic effects which can be combined in connection with a corresponding glazing coating (or several glazing coatings). Thus for example a pumping effect can be produced, wherein, upon tilting the optically variable surface pattern, e.g. the contours of a value number pump towards the outside (i.e. become larger) and change their color while doing so. Also representations with shape changes (morphing effects) are possible with changing colors.

Further, it is possible to provide regions without color change as a kind of color reference in order to accentuate the color change effect. Thus e.g. one of the two bars 25, 26 can have a color gradation (for example yellow-green) in one half and be completely covered with a color present in the color gradation (e.g. yellow) in the other half. The bar would consequently be completely yellow at a first viewing angle in a first position and, upon movement, would then remain yellow in one half and shift to green in the other half. Such a reference color makes such a color change visible at an early stage and clearly. Such a reference color can also be present in the form of any desired other and not necessarily glazing printing ink, and of course does not necessarily also need to have a kinetic effect.

In the embodiments of the optically variable surface pattern 10 described so far, it was always assumed that reflective facets 14, 15, 22, 27 and 28 are present. However, reflective facets 14, 15, 22, 27 and 28 are not obligatorily required, but also generally reflection elements can be utilized, wherein, in dependence on the viewing angle, reflection elements differing from these reflection elements light up brightly at different angles in the color tone determined by the corresponding glazing ink.

The surface pattern 10 according to the invention consequently does not represent a true color change, but an apparent color change. A true color change is to be understood as a color change as can for example be realized with a thin-film coating, wherein each individual reflection element having the thin-film coating appears in a different color from different directions. In the optically variable surface patterns 10 according to the invention, in contrast, the apparent color change is of the type that different colors light up brightly for the viewer. In fact, however, a reflection element with a glazing blue coating remains blue when viewed from any direction, and a reflection element having a glazing red coating remains red when viewed from any direction. Since in the optically variable surface pattern 10 according to the invention the reflected brightness changes strongly, though, a viewer practically perceives only or mainly the color or colors of the respectively bright reflection elements. The fact that the colors of the other reflection elements are also still present clearly recedes into the background for the viewer or is even no longer noticed by the viewer. The colors are consequently stationary and it is only the corresponding brightness that changes.

The reflection elements preferably substantially reflect achromatically, i.e. practically white. This has the advantage that practically any desired color tone can be achieved with the glazing ink layer. However, the reflection elements themselves can also have a certain chromaticity, such as can for example be realized by a gold-colored metalization. In this case, for example a green color impression can be achieved by printing over with glazing blue. A color change gold-green can consequently be achieved also with only one glazing color and/or only one glazing ink layer.

The reflection elements can be present in the form of relief structures, which are formed in an embossing lacquer (e.g. thermoplastic or radiation-curing) and provided with a reflective or at least reflection-enhancing coating. This coating can be present in particular in the form of a metalization (e.g. vapor-depositing of a metal, such as Cr, Al, Cu, Au, Ag or of an alloy). Alternatively, e.g. also a highly refractive dielectric coating can be applied, whereby in particular transparent variants of the optically variable surface pattern 10 according to the invention can be realized. Such a transparent variant can be provided for example in a transparent region, such as e.g. in a banknote window.

For example a comparatively thin highly refractive layer would be advantageous, e.g. a 40 nm thick $TiO_2$ layer, which can be vapor-deposited still comparatively cost-effectively and substantially reflects achromatically. Further, it is possible to apply a coating producing a true color change all over or in certain regions (e.g. by vapor deposition of absorber/dielectric/reflector), so that interesting combinations can be produced of a true color change and the apparent color change according to the invention.

The relief structures can be realized (preferably substantially) by ray-optically active facets and/or micro mirrors. The dimensions of these facets or micro mirrors can be between 2 µm and 300 µm, preferably between 3 µm and 50 µm and particularly preferably between 5 µm and 20 µm. The facets or micro mirrors can be arranged irregularly with (quasi) random variations or form sawtooth gratings as a regular arrangement.

Alternatively to such facet structures also optically-diffractively active reflection elements can be made use of, which advantageously appear achromatic (e.g. matte structures). The associated relief structures can have a symmetrical or an asymmetrical profile (sawtooth grating). With asymmetrical diffractive structures higher diffraction efficiencies can be achieved advantageously.

Further, the reflection elements can also be present in the form of reflective pigments of a printing ink. Such platelet-shaped pigments are advantageous which have at least one specular metallic layer. The orientation of the pigments can for example be effected by depositing on corresponding relief structures. A different advantageous variant is to utilize magnetic pigments and to orient these magnetically, such as is done for example also in the printing ink SPARK of the Swiss company SICPA HOLDINGS SA. However, in contrast to SPARK, according to the invention the pigments are not provided with a color-shifting coating, but covered with glazing inks (in particular in certain regions with different glazing inks). It is possible for example to simply print a glazing ink over the ink with the reflective pigments. Particularly advantageously, the reflective pigments can alternatively be incorporated directly in an otherwise glazing colored ink.

A further alternative to the manufacture of the reflection elements is embossing into a metalized layer, in particular by steel engraving into a metalized foil or into a printing ink with platelet-shaped metallic pigments, which can be applied for example previously by screen printing.

The glazing ink layer or the glazing ink layers of the optically variable surface pattern can be applied by means of largely any desired printing method, for example by offset printing, gravure printing, flexographic printing or digital printing, in particular inkjet. In digital printing, also an individualization is possible, for example printing a consecutive numbering, which generally does not need to correlate with the orientations of the embossed structures, however.

The glazing coating can also have additional security features, such as e.g. fluorescence.

The optically variable surface pattern according to the invention can be used in particular in the field of banknotes. Here, it can be printed on a banknote in the form of a printing ink or be present as a foil element with embossed relief structures in the form of a security strip, windowed thread or patch. The reflection elements and the glazing ink (or glazing inks) can be present already together as a foil element on the banknote substrate or can both be produced only during banknote printing (e.g. printing reflective pigments in screen printing and magnetically orienting them, then printing over with glazing ink). It is also possible that a foil element first provides only the reflection elements (e.g. metalized facet structures) and the printing over with glazing inks is then effected during banknote printing (e.g. offset printing).

Figure 11:
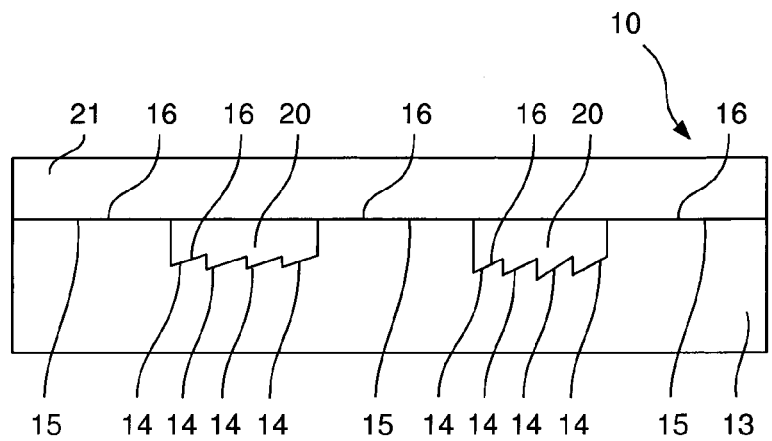
FIG. 11 a sectional view of an embodiment of the optically variable surface pattern 10 to explain a first manufacturing method, and FIG. 12 a sectional view of an embodiment of the optically variable surface pattern 10 to explain a second manufacturing method.

In connection with FIG. 11 a method for manufacturing an embodiment of the optically variable surface pattern 10 is described, wherein the optically variable surface pattern has first facets 14 and second facets 15 provided therebetween, which can also be referred to as supporting structure.

For the manufacture, the first facets 14 (here in the form of sawtooth gratings) are deep-embossed in an embossing lacquer 13 and coated with a reflective metalization 16. Supporting structures (second facets 15) of similar dimensions are disposed therebetween, which are also mirror-coated by the metalization 16.

Then a first ink layer 20 (e.g. cyan) is applied all over and subsequently scraped off, so that this first ink then remains present only in the regions above the first facets 14 in the depressions.

Subsequently, the second ink layer 21 (e.g. yellow) is applied all over.

In this case the surface pattern 10 thus lights up yellow (or golden) in the mirror reflex of the supporting structures 15, and in the mixed color green in the reflex of the first facets 14 in the depressions.

Figure 12:
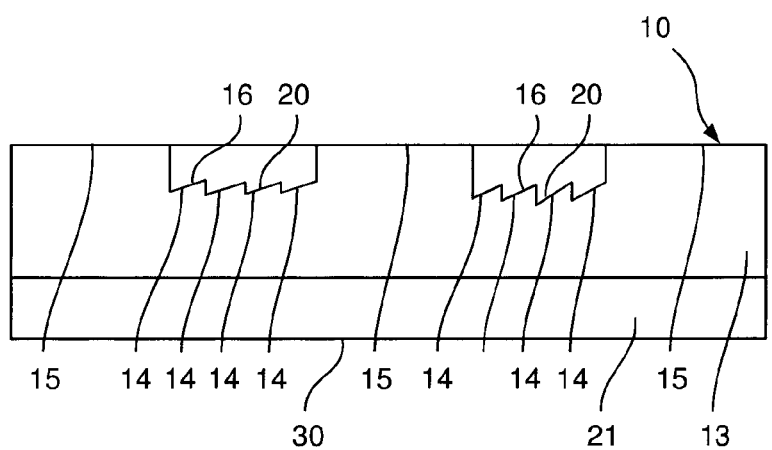

If one wishes not to see a mixed color, but two completely independent colors, it is possible to proceed as outlined in FIG. 12.

Again, the first facets 14 are deep-embossed and supporting structures 15 are arranged therebetween. The embossing is then metalized. When a suitably prepared embossing lacquer 13 is utilized, the metalization can be removed from the supporting structures 15 in the fashion that is described for example in the print DE 10 2010 019 766 A1. Then the first ink layer 20 can be applied all over and scraped off. Subsequently, the second ink layer 21 is applied to the lower side of the embossing and is advantageously provided with a specular metalization 30. In practice, the lacquer layer 13 frequently comprises a transparent embossing lacquer and a not shown carrier foil. In the optically variable surface pattern 10 manufactured according to FIG. 12, a viewer sees the color of the second glazing ink layer 21 in the mirror reflex of the metalization 30, and the color of the first glazing ink layer 20 in the mirror reflex of the first facets 14, wherein the visible colors can thereby be chosen completely independently from each other.

In a variation of the optically variable surface pattern 10 shown in FIG. 12, the metalization 30 can be applied also to non-evenly embossed reflection elements (not shown) instead of on a flat interface, in order to be able to freely chose the reflection angle for the color of the second glazing ink layer 21.

Alternatively, a registration can also be omitted consciously, and for example a moiré effect can be made use of. For this purpose, for example first and second reflection elements 14, 15 are arranged on a preferably periodical grid. Then the surface pattern 10 is printed over with a first ink layer and a second ink layer. At least one of these inks is printed in gridded fashion with a grid width that preferably deviates somewhat from the grid width of the reflection elements. A moiré pattern is created thereby, which becomes visible in the corresponding, different colors in the mirror reflex of the reflection elements.

Thus for example the reflection elements can be arranged in strips of a width of respectively 100 μm. Then the surface pattern is printed over with a line grid of the first color (e.g. magenta), having alternatingly 110 μm wide lines and 110 μm wide spaces. Subsequently, the second color can be applied all over (e.g. yellow). Due to the moiré effect, a line grid of a period of around 2 mm appears in the mirror reflex of the first reflection elements, in which line grid in this example yellow and red (=mixed color yellow+magenta) lines are present and/or merge into one another almost continuously. In the mirror reflex of the second reflection elements a color change is effected in the moiré pattern, i.e. the yellow lines turn red and the red lines turn yellow.

In further variants the grids of the reflection elements and/or the grids of the glazing ink layers can be displaced for example. The corresponding region then has a displaced grid also in the moiré pattern, so that the contours of these regions become visible for example in the form of a symbol or of a value number.

The required registration of the reflection elements and of the glazing ink layer(s) for forming the optically variable surface pattern 10 can be achieved by different methods. Thus e.g. the glazing ink can be applied to relief structures that are metalized over a large area (e.g. Al metalization) in the form of a dyed etching resist in the form of a motif, such as e.g. of a value number or of a symbol. After subsequent etching demetalization the metalization is present only under the etching resist, with the metalization being etched away in adjacent areas, whereby the relief structures practically lose their reflective effect. The glazing colored etching resist is then in perfect register with the metalization after etching.

Further, during the etching, the etching resist can protect not only the metalization, but also a further ink for example showing a color gradation with larger register tolerances. Thus for example first a color gradation in a first color (here cyan color gradation) can be printed over a relatively large area. Above this, the desired motif (here a circle) is printed in full tone with a dyed (here e.g. yellow) etching resist. The first ink is chosen such that it can be removed in the places where it is not covered by the etching resist, for example by the etching solution that is required for the demetalization anyway or by a different solvent. After the etching demetalization a circularly metalized region is obtained, which is in exact register with the circular contours of the yellow ink and/or the contours of the color gradation of the first ink.

The contours of regions with glazing inks can also be placed in exact register with the contours of reflection elements present in certain regions by means of a laser. The reflection elements can e.g. be present in the form of embossed relief structures, which are metalized only in certain regions (e.g. demetalization with washing procedure). The glazing inks are then printed such that they extend beyond the metalized regions at the edges. The protruding ink is then removed by means of a laser, wherein the metalized region serves as laser-resistant mask.

Conversely, also a demetalization through a laser-resistant glazing colored mask is possible, wherein the contours of a laser demetalization are then registered accurately onto the printed image of the glazing ink.

A further laser-based possibility is to eliminate both the metal and the glazing ink in certain regions simultaneously by means of a mask. In the remaining region then the edges of the demetalization and the ink(s) are also in perfect register. By beam widening and different ablation thresholds of the ink(s) and/or of the metalization a narrow edge region (visible or also invisible to the unarmed eye) can result, which contains only metal or only the ink, which can serve as a further authenticity feature.

In many cases it is sufficient when merely the edges of the regions printed with reflection elements and/or glazing ink are congruent instead of an accurate registration. For this purpose it is possible for example to imitate a perfect registration by printing an inconspicuous contour using an opaque ink.

Thus e.g. the value number "50" can be realized with metalized embossed structures, with rolling-bar effect and color gradation with two glazing inks, with a height of the number of around 10 nm and an assumed register accuracy of ±200 µm. Here, it is completely sufficient to place the border of the demetalized region (for example by washing ink printing) in a ±200 µm register with the embossed structure at, provided that these still have the corresponding embossed motif 200 µm further adjoining the remaining metalization. (Merely the center positioning of the rolling bar within the value number is displaced here by a maximum of 200 µm, which is inconspicuous.) Subsequently, the glazing ink can be printed on this region with a register accuracy of ±200 µm with the demetalization. Depending on the direction of the variation, there are now regions present at the edge of the value number which light up metallically colorless (metalization is present, but no glazing ink) or merely show the glazing ink (only the ink is present, but no metalization). This edge can now be printed over by a contour with an opaque ink, for example here again with a register accuracy of ±200 µm with the demetalization and consequently a maximum of ±400 µm register deviation with the glazing ink. With a contour of the line thickness of 0.8 mm the register variations could then be hidden completely by the opaque ink. A contour in the color of the background (for example white in the case of later application to white paper) is particularly advantageous.

When there are register variations between the reflection elements and the glazing ink(s), the outer region where these are visible can also be simply cut off. This is possible in particular in a patch application.

A direct connection can be established between the orientation of the reflection elements and the applied ink by for example sublimating the ink and having it hit the reflection elements (e.g. micro mirrors) in directed fashion. When the ink particles hit the reflection surface roughly perpendicularly, a comparatively high area coverage is achieved, whereas hitting at a flat angle will result in an only very small area coverage. The advantageous color gradations can thus practically arise automatically in continuously varying reflection directions or finely interlaced representations can be covered with different inks in exact register by directed sublimation with different inks from different directions.

LIST OF REFERENCE NUMBERS 10 optically variable surface pattern
11 banknote
12 windowed thread
13 embossing lacquer layer
14 first facets
15 second facets
16 reflective coating
17 first partial region
18 second partial region
19 transparent intermediate layer
20 first glazing ink layer
21 second glazing ink layer
22 facets
23 glazing ink layer
25 first bar
26 second bar
27 facets
28 facets
29 glazing ink layer
30 metalization
L1 incident light
L2 reflected light
L3 reflected light
P1 arrow
P2 arrow
P3 arrow

The invention claimed is:

1. An optically variable surface pattern having at least two partial regions with reflection elements;
    wherein the reflection elements of the first partial region on the one hand and the reflection elements of the second partial region on the other hand reflect impinging light in different reflection directions;
    wherein the first partial region is so covered with a first glazing ink layer that a viewer, upon a change of the viewing angle at which the viewer views the optically variable surface pattern and despite the absence of an interference coating, sees the first partial region glow in a first color upon reaching a first viewing angle, and the second partial region glow in a second color that is different from the first color upon reaching a second viewing angle, the color in which each partial region lights up being adjustable using only the first glazing ink layer, wherein, for the viewer, upon changing the viewing angle, the partial regions glow consecutively in such a fashion that a movement of a motif is reproduced, wherein at least a part of the motif glows consecutively in the corresponding colors of the partial regions, and wherein a part of the motif always glows in the same color upon viewing at the corresponding viewing angles of the partial regions.

2. The optically variable surface pattern according to claim 1, wherein the second partial region is covered with a second glazing ink layer which differs in color tone from the first glazing ink layer.

3. The optically variable surface pattern according to claim 1, wherein the reflection elements reflect achromatically.

4. The optically variable surface pattern according to claim 1, wherein at least one further partial region with reflection elements is provided, which is covered with a further glazing ink layer, wherein the reflection elements of the further partial region are so oriented that the viewer, upon changing the viewing angle, sees the further partial region glow in a color that differs from the first and/or second color upon reaching a further viewing angle.

5. The optically variable surface pattern according to claim 1, wherein a sequence of the colors of the partial regions glowing consecutively upon changing the viewing angle contains a color change to and/or from the color white.

6. The optically variable surface pattern according to claim 1, wherein a sequence of the colors of the partial regions glowing consecutively upon changing the viewing angle has at least one color several times.

7. The optically variable surface pattern according to claim 1, wherein a sequence of the colors of the partial regions glowing consecutively upon changing the viewing angle is different to a sequence which would occur by interference in a thin-film coating.

8. The optically variable surface pattern according to claim 1, wherein it has a reference region which always glows in the same color at the corresponding viewing angles of the partial regions.

9. The optically variable surface pattern according to claim 1, wherein the first and the second partial region are so mutually interlaced that an apparently uniform region is presented to the viewer, said region glowing in the first color when viewed at the first viewing angle, and in the second color when viewed at the second viewing angle.

10. The optically variable surface pattern according to claim 1, wherein reflection elements of at least one of the partial regions are formed by relief structures with ray-optically active reflective facets.

11. The optically variable surface pattern according to claim 1, wherein reflection elements of at least one of the partial regions are formed by optically-diffractively active reflective relief structures.

12. The optically variable surface pattern according to claim 1, wherein reflection elements of at least one of the partial regions are realized by oriented pigments of a printing ink.

13. The optically variable surface pattern according to claim 1, wherein reflection elements of at least one of the partial regions are formed by relief structures in a metalized foil.

14. The optically variable surface pattern according to claim 1, wherein the colors which the partial regions have to the viewer upon viewing are independent of the viewing angle.

15. The optically variable surface pattern according to claim 1, wherein the first glazing ink layer has a register accuracy of less than 200 μm with the reflection elements of the first partial region.

16. The optically variable surface pattern according to claim 1, wherein the optically variable surface pattern is provided as a security element for a security paper or value document.

17. A value document with an optically variable surface pattern according to claim 1.

* * * * *